US009975807B2

(12) United States Patent
Michaux et al.

(10) Patent No.: US 9,975,807 B2
(45) Date of Patent: May 22, 2018

(54) RETARDED CEMENT COMPOSITIONS AND METHODS FOR WELL COMPLETIONS

(75) Inventors: Michel Michaux, Verrieres-le-Buisson (FR); Laurent Gabilly, Malakoff (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 350 days.

(21) Appl. No.: 13/881,709

(22) PCT Filed: Oct. 28, 2011

(86) PCT No.: PCT/EP2011/005533
§ 371 (c)(1),
(2), (4) Date: Jun. 25, 2013

(87) PCT Pub. No.: WO2012/059225
PCT Pub. Date: May 10, 2012

(65) Prior Publication Data
US 2013/0269940 A1 Oct. 17, 2013

(30) Foreign Application Priority Data
Nov. 5, 2010 (EP) .................................. 10290598

(51) Int. Cl.
| | |
|---|---|
| *C04B 28/04* | (2006.01) |
| *E21B 33/13* | (2006.01) |
| *C04B 24/00* | (2006.01) |
| *C04B 40/00* | (2006.01) |
| *C09K 8/467* | (2006.01) |
| *C04B 103/22* | (2006.01) |

(52) U.S. Cl.
CPC ............ *C04B 24/006* (2013.01); *C04B 28/04* (2013.01); *C04B 40/0039* (2013.01); *C09K 8/467* (2013.01); *E21B 33/13* (2013.01); *C04B 2103/22* (2013.01)

(58) Field of Classification Search
CPC ....... E21B 33/13; C04B 24/006; C04B 28/04; C04B 40/0039; C04B 2103/22
See application file for complete search history.

(56) References Cited

U.S. PATENT DOCUMENTS 2,748,159 A 5/1956 Finelli et al.
3,662,830 A * 5/1972 Martin ................... C04B 28/02
106/694

(Continued)

FOREIGN PATENT DOCUMENTS

MX MX/a/2007/004317 4/2006
WO 2006/040511 4/2006

OTHER PUBLICATIONS

Examination report for the equivalent Canadian patent application No. 2816383 dated Oct. 10, 2014.
(Continued)

*Primary Examiner* — Zakiya W Bates
*Assistant Examiner* — Crystal J Miller
(74) *Attorney, Agent, or Firm* — Andrea Tran

(57) ABSTRACT

Cement retarders are based on blends of lignosulfonate compounds, borate compounds and gluconate compounds. The compounds are present in certain ratios that allow the retarders to operate at temperatures and pressures up to and exceeding about 176° C. and 152 MPa. The retarders may also be provided in liquid form, improving their suitability for use at offshore well-site locations.

8 Claims, 1 Drawing Sheet

(56) References Cited

U.S. PATENT DOCUMENTS

| | | | | |
|---|---|---|---|---|
| 3,748,159 A * | 7/1973 | George | C04B 28/02 | 106/717 |
| 3,799,874 A * | 3/1974 | Parker | C09K 8/424 | 166/291 |
| 3,821,985 A * | 7/1974 | George | C09K 8/46 | 166/293 |
| 3,856,541 A * | 12/1974 | Martin | C04B 24/06 | 106/717 |
| 4,210,455 A * | 7/1980 | Metcalf | C04B 24/10 | 106/719 |
| 4,375,985 A * | 3/1983 | Guillaud | C04B 18/125 | 106/622 |
| 4,640,715 A | 2/1987 | Heitzmann et al. | | |
| 4,990,191 A * | 2/1991 | Schilling | C04B 24/18 | 106/726 |
| 5,274,014 A * | 12/1993 | Silverton | C08L 95/005 | 106/123.13 |
| 5,337,824 A * | 8/1994 | Cowan | E21B 21/00 | 166/292 |
| 5,358,044 A * | 10/1994 | Hale | C04B 18/049 | 166/293 |
| 5,361,841 A * | 11/1994 | Hale | C04B 24/32 | 166/293 |
| 5,361,842 A * | 11/1994 | Hale | C04B 28/08 | 166/292 |
| 5,379,840 A * | 1/1995 | Cowan | C04B 28/08 | 106/789 |
| 5,447,197 A * | 9/1995 | Rae | C04B 28/08 | 106/728 |
| 5,503,671 A * | 4/1996 | Casabonne | C04B 24/003 | 106/717 |
| 5,503,672 A * | 4/1996 | Barlet-Gouedard | C04B 24/003 | 106/717 |
| 5,547,506 A * | 8/1996 | Rae | C04B 28/08 | 106/714 |
| 5,613,558 A * | 3/1997 | Dillenbeck, III | C04B 22/068 | 106/720 |
| 5,658,380 A * | 8/1997 | Dillenbeck, III | C04B 22/068 | 106/673 |
| 6,454,004 B2 | 9/2002 | Reddy | C04B 28/02 | 106/639 |
| 6,626,243 B1 * | 9/2003 | Go Boncan | C04B 28/04 | 166/285 |
| 6,630,021 B2 * | 10/2003 | Reddy | C04B 28/02 | 106/639 |
| 6,793,730 B2 * | 9/2004 | Reddy | C04B 28/02 | 106/639 |
| 6,916,369 B2 * | 7/2005 | Chun | C04B 24/06 | 106/156.2 |
| 7,004,256 B1 | 2/2006 | Chatterji et al. | | |
| 7,048,793 B2 * | 5/2006 | Chun | C04B 24/06 | 106/696 |
| 7,462,236 B2 * | 12/2008 | Chun | C04B 24/06 | 106/729 |
| 7,678,190 B2 * | 3/2010 | Michaux | C04B 28/02 | 106/696 |
| 7,946,343 B2 * | 5/2011 | Caritey | C04B 28/04 | 166/293 |
| 7,947,127 B2 * | 5/2011 | Michaux | C04B 28/02 | 106/724 |
| 9,139,476 B2 * | 9/2015 | Khatri | C04B 24/14 | 166/285 |
| 2002/0005287 A1 * | 1/2002 | Reddy | C04B 28/02 | 166/295 |
| 2003/0006038 A1 * | 1/2003 | Reddy | C04B 28/02 | 166/293 |
| 2003/0172850 A1 * | 9/2003 | Chun | C04B 24/06 | 106/823 |
| 2003/0217847 A1 * | 11/2003 | Reddy | C04B 28/02 | 166/293 |
| 2005/0096280 A1 * | 5/2005 | Chun | C04B 24/06 | 514/22 |
| 2007/0107638 A1 * | 5/2007 | Chun | C04B 24/06 | 106/729 |
| 2007/0235192 A1 * | 10/2007 | Michaux | C04B 28/02 | 166/293 |
| 2008/0318811 A1 * | 12/2008 | Caritey | C04B 28/04 | 507/208 |
| 2010/0168273 A1 * | 7/2010 | Michaux | C04B 28/02 | 523/130 |
| 2011/0073311 A1 * | 3/2011 | Porcherie | C04B 28/006 | 166/305.1 |
| 2011/0108274 A1 * | 5/2011 | Caritey | C04B 28/04 | 166/293 |
| 2012/0103609 A1 * | 5/2012 | Khatri | C04B 24/14 | 166/285 |

OTHER PUBLICATIONS

'Well Cementing', 2006, Schlumberger article 'Cement Additives and Mechanisms of Action', pp. 49-91.

Office action for the equivalent Mexican patent application No. MX/a/2013/005019 dated May 25, 2015.

Examination Report issued in Malaysian Patent Appl. No. PI 2013700708 dated Apr. 28, 2017; 3 pages.

* cited by examiner

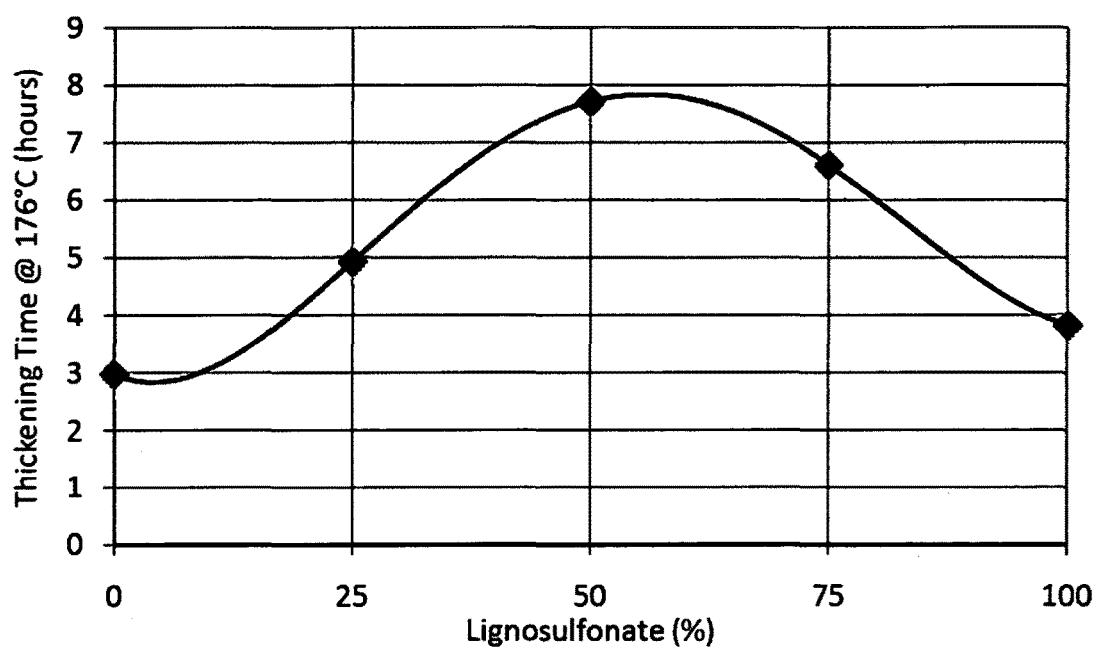

RETARDED CEMENT COMPOSITIONS AND METHODS FOR WELL COMPLETIONS

BACKGROUND

The statements in this section merely provide background information related to the present disclosure and may not constitute prior art.

This disclosure relates to compositions and methods for treating subterranean formations, in particular, compositions and methods for cementing subterranean wells.

During the construction of subterranean wells, it is common, during and after drilling, to place a tubular body in the wellbore. The tubular body may comprise drillpipe, casing, liner, coiled tubing or combinations thereof. The purpose of the tubular body is to act as a conduit through which desirable fluids from the well may travel and be collected. The tubular body is normally secured in the well by a cement sheath. The cement sheath provides mechanical support and hydraulic isolation between the zones or layers that the well penetrates. The latter function is important because it prevents hydraulic communication between zones that may result in contamination. For example, the cement sheath blocks fluids from oil or gas zones from entering the water table and polluting drinking water. In addition, to optimize a well's production efficiency, it may be desirable to isolate, for example, a gas-producing zone from an oil-producing zone. The cement sheath achieves hydraulic isolation because of its low permeability. In addition, intimate bonding between the cement sheath and both the tubular body and borehole is necessary to prevent leaks.

Optimal cement-sheath placement often requires that the cement slurry contain a retarder. Cement retarders delay the setting of the cement slurry for a period sufficient to allow slurry mixing and slurry placement in the annular region between the casing and the borehole wall, or between the casing and another casing string.

A wide range of chemical compounds may be employed as cement retarders. The most common classes include lignosulfonates, cellulose derivatives, hydroxycarboxylic acids, saccharide compounds, organophosphonates and certain inorganic compounds such as sodium chloride (in high concentrations) and zinc oxide. A more complete discussion of retarders for well cements may be found in the following publication—Nelson E B, Michaux M and Drochon B: "Cement Additives and Mechanisms of Action," in Nelson E B and Guillot D. (eds.): *Well Cementing* ($2^{nd}$ Edition), Schlumberger, Houston (2006) 49-91.

Certain types of retarders have been blended with other compounds to extend their useful temperature range, improve cement-slurry properties, or both. For example, the useful temperature range of certain lignosulfonate retarders may be extended to more than 260° C. by adding sodium tetraborate decahydrate (borax). Sodium gluconate may be blended with a lignosulfonate and tartaric acid to improve the rheological properties of the cement slurry. Thus, a myriad of retarders and retarder blends exist which may be applicable to a wide range of subterranean-well conditions.

Cement-retarder technology for well cements is sophisticated; however, as exploration and production operations continue to move into environmentally sensitive areas, the population of retarders that may be used is increasingly restricted. This is particularly true in the North Sea. The countries that operate in the North Sea (UK, Norway, Denmark and Holland) maintain a list of chemical products that "pose little or no risk to the environment". These materials should meet the following criteria. (1) All of the organic components present in the material must be biodegradable in seawater. (2) All of the components should have a low toxicity to fish (*Scophthalamus Maximum*), marine species (*Acartia Tonsa*) and algae (*Skeletonema Costatum*). (3) All of the components should not bioaccumulate. (4) The additive should not contain any prohibited chemicals.

It thus becomes more and more challenging to develop efficient cement retarders (and other types of additives) that can meet these criteria. This is especially true when the cement slurries must be placed in high-pressure/high-temperature (HPHT) wells.

Despite the valuable contributions of the prior art, it would be advantageous to have efficient retarders which perform suitably in HPHT environments. In addition, for logistical reasons in offshore locations, it would be advantageous if the retarders were available in liquid form.

SUMMARY

In an aspect, embodiments relate to well-cementing compositions. In a further aspect, embodiments relate to methods for cementing a subterranean well. In yet a further aspect, embodiment relate to uses of Portland-cement retarders comprising a borate compound, a lignosulfonate compound and a gluconate compound.

BRIEF DESCRIPTION OF THE DRAWINGS

FIG. 1 is a graph showing the effect of the sodium lignosulfonate-to-sodium gluconate ratio on the thickening time of cement slurries containing sodium tetraborate decahydrate.

DETAILED DESCRIPTION

At the outset, it should be noted that in the development of any such actual embodiment, numerous implementation—specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

All ratio or percentages described here after are by weight unless otherwise stated.

As stated earlier, it would be advantageous to have cement retarders that meet the "North-sea" list criteria and operate efficiently in a HPHT environment—preferably at temperatures as high as at least 176° C. (350° F.) and 152 MPa (22,000 psi). In addition, availability of the retarder in liquid form would be desirable. The inventors have provided such retarders. They discovered that certain blends of lignosulfonates, gluconates and borates satisfy the goals described above.

Embodiments relate to well-cementing compositions that comprise Portland cement, water and a retarder comprising a lignosulfonate compound, a borate compound and a gluconate compound. The retarder is formulated such that the lignosulfonate:borate-compound concentration ratio is below about 0.75:1. The composition may also be pumpable. Those skilled in the art will recognize that a pumpable cement slurry usually has a viscosity lower than 1000 mPa·s at a shear rate of 100 s$^{-1}$.

The lignosulfonate compound may be (but would not be limited to) sodium lignosulfonate, calcium lignosulfonate, ammonium lignosulfonate and combinations thereof. The gluconate compound may be (but would not be limited to) sodium gluconate, calcium gluconate, ammonium gluconate, zinc gluconate, iron gluconate and combinations thereof. Sodium lignosulfonate and sodium gluconate are preferred.

It is also preferred that the lignosulfonate compounds be refined. Without wishing to be bound by any theory, the refining process removes carbohydrates (mostly pentoses and hexoses). The use of lignosulfonates based on oxylignins is particularly preferred. Oxylignins are derived from lignin that has been oxidized by the vanillin process.

The borate compound may be (but would not be limited to) boric acid, sodium metaborate, potassium metaborate, sodium diborate, potassium diborate, sodium triborate, potassium triborate, sodium tetraborate, potassium tetraborate, sodium pentaborate, potassium pentaborate and combinations thereof. The borate compounds may contain waters of hydration or be anhydrous. Sodium tetraborate decahydrate and sodium pentaborate decahydrate are preferred.

Embodiments relate to methods for cementing a subterranean well, comprising providing a well-cementing composition that comprises Portland cement, water and a retarder comprising a lignosulfonate compound, a borate compound and a gluconate compound. The retarder is formulated such that the lignosulfonate:borate-compound concentration ratio is below about 0.75:1. The composition is placed in the well. Those skilled in the art will recognize that the method may pertain to both primary and remedial cementing operations.

Embodiments relate to uses of a Portland-cement retarder comprising a lignosulfonate compound, a borate compound and a gluconate compound, wherein the lignosulfonate:borate-compound concentration ratio is below about 0.75:1.

For all embodiments, the sodium lignosulfonate:sodium gluconate concentration ratio is preferably between about 70:30 and 30:70. Moreover, the preferred ratio lignosulfonate:borate compounds:gluconate compounds is between 0.1:1.0:0.1 and about 0.5:1.0:0.5, more preferably between 0.25:1.0:0.25 and 0.5:1.0:0.5. In yet even further preferred version, when the borate compound comprises sodium tetraborate decahydrate, the preferred sodium lignosulfonate:sodium tetraborate decahydrate:sodium gluconate concentration ratio is preferably between about 0.1:1.0:0.1 and about 0.5:1.0:0.5 by weight. Also, when the borate compound comprises sodium pentaborate decahydrate, the preferred sodium lignosulfonate:sodium pentaborate decahydrate:sodium gluconate concentration ratio is preferably between about 0.1:1.0:0.1 and about 0.5:1.0:0.5 by weight, and more preferably between about 0.25:1.0:0.25 and about 0.5:1.0:0.5 by weight.

The cement compositions may further comprise more additives such as (but not limited to) extenders, fluid-loss additives, lost-circulation additives, additives for improving set-cement flexibility, self-healing additives, antifoam agents, dispersants, gas generating additives and anti-settling agents.

EXAMPLES

The following examples serve to further illustrate the disclosure.

For all examples, cement slurries were prepared with Dyckerhoff Black Label Class G cement, at a density of 1917 kg/m$^3$. Liquid additives were added to the mix fluid, and solid additives were dry blended with the cement.

The compounds that comprised the retarder formulations were sodium lignosulfonate (an oxylignin), sodium gluconate and either sodium tetraborate decahydrate or sodium pentaborate decahydrate.

All cement slurries contained 2.66 L/tonne of polypropylene-glycol antifoam agent. The test temperatures exceeded 110° C.; therefore, silica flour was added at a concentration of 35% by weight of cement (BWOC). An antisettling agent based on welan gum was often added to decrease the free-fluid volume.

The compatibility of the retarder formulations with a fluid-loss additive (AMPS-acrylamide copolymer) and a gas-migration-prevention additive (styrene-butadiene latex) was evaluated.

Cement-slurry preparation, free-fluid measurements, thickening-time measurements, fluid-loss measurements and rheological measurements were performed according to procedures published in ISO Publication 10426-2. Thickening-time tests were performed at three temperatures (Table 1). Fluid-loss measurements were performed with a stirred fluid-loss cell.

TABLE 1

Experimental Parameters for Thickening-Time Tests

| Initial Temperature (° C.) | Final Temperature (° C.) | Initial Pressure (MPa) | Final Pressure (MPa) | Time to Temperature/ Pressure (min) | Heating Rate (° C./min) |
|---|---|---|---|---|---|
| 27 | 110 | 12.1 | 92 | 29 | 2.86 |
| 27 | 150 | 13.8 | 111 | 34 | 3.62 |
| 27 | 176 | 13.8 | 152 | 44 | 3.39 |

Example 1

Five cement slurries were prepared, all with the same sodium-tetraborate-decahydrate concentration: 2% BWOC. The combined sodium-lignosulfonate and sodium-gluconate concentration was held constant at 1% BWOC. The sodium lignosulfonate-to-sodium gluconate ratio was varied: 0:100; 25:75; 50:50, 75:25; and 100:0. The experimental results are given in Table 2.

TABLE 2

Effect of sodium lignosulfonate-to-sodium gluconate ratio on cement-slurry properties.

| | | | | | |
|---|---|---|---|---|---|
| Sodium Tetraborate (% BWOC) | 2 | 2 | 2 | 2 | 2 |
| Sodium Lignosulfonate (% BWOC) | — | 0.25 | 0.5 | 0.75 | 1 |
| Sodium Gluconate (% BWOC) | 1 | 0.75 | .5 | 0.25 | — |
| Mixing Rheology | | | | | |
| Plastic Viscosity (mPa · s) | 132 | 142 | 129 | 130 | 135 |
| Yield Stress (Pa) | 11.9 | 8.6 | 6.7 | 6.7 | 7.2 |
| ISO/API Rheology at 85° C. | | | | | |
| Plastic Viscosity (mPa · s) | 58 | 58 | 58 | 60 | 58 |
| Yield Stress (Pa) | 5.7 | 4.3 | 4.1 | 3.4 | 3.8 |
| Free Fluid at 85° C. (%) | 0.8 | 1.6 | 1.2 | 1.6 | 1.6 |
| Thickening Time at 176° C. and 152 MPa (hr:min) | 2:59 | 4:56 | 7:43 | 6:37 | 3:50 |

The thickening times were short when only either sodium gluconate or sodium lignosulfonate were present with sodium tetraborate decahydrate. However, when sodium gluconate and sodium lignosulfonate were present together with sodium tetraborate decahydrate, the thickening times were longer. This behavior highlights the synergy between sodium lignosulfonate and sodium gluconate. As shown in FIG. 1, the longest thickening times are achieved when the sodium lignosulfonate-to-sodium gluconate weight ratio is close to 50:50 (i.e., 0.5% BWOC sodium lignosulfonate and 0.5% BWOC sodium gluconate).

The rheological properties and free-fluid values of the cement slurries were not significantly affected by varying the sodium lignosulfonate-to-sodium gluconate ratio. The cement slurries were also well dispersed, as shown by the low yield-stress values.

Example 2

The concentrations of sodium lignosulfonate and sodium gluconate were maintained constant at 0.5% BWOC. The concentration of sodium tetraborate decahydrate was varied between 1% and 3% BWOC. The thickening times of the cement slurries were measured at 176° C. and 152 MPa. The experimental results are shown in Table 3.

TABLE 3

Effect of sodium-tetraborate-decahydrate concentration on cement-slurry properties

| | Sodium Tetraborate (% BWOC) | | |
|---|---|---|---|
| | 1 | 2 | 3 |
| Mixing Rheology | | | |
| Plastic Viscosity (mPa · s) | 156 | 129 | 153 |
| Yield Stress (Pa) | 10 | 6.7 | 11 |
| ISO/API Rheology at 85° C. | | | |
| Plastic Viscosity (mPa · s) | 61 | 58 | 63 |
| Yield Stress (Pa) | 5.3 | 4.1 | 4.2 |
| Free Fluid at 85° C. (%) | 0.6 | 1.2 | 0.4 |
| Thickening Time at 176° C. and 152 MPa (hr:min) | 2:43 | 7:43 | 11:08 |

The thickening time was lengthened significantly when the sodium-tetraborate-decahydrate concentration increased. Maintaining a constant sodium-lignosulfonate and sodium-gluconate concentration highlighted the strong synergy between the sodium tetraborate decahydrate and the 50:50 mixture of sodium lignosulfonate and sodium gluconate. The rheological properties and free-fluid values were not affected significantly when the sodium-tetraborate-decahydrate concentration was varied. The low yield-stress values show that the slurries were well dispersed.

Example 3

The sodium-tetraborate-decahydrate concentration needed to achieve long thickening times at 176° C. and 152 MPa was typically 1% to 3% BWOC. The solubility of sodium tetraborate decahydrate in water is about 50 g/L at 25° C. This solubility is relatively low to formulate a practical liquid version of the retarder.

The solubility of sodium pentaborate decahydrate in water is about 150 g/L at 25° C.; therefore, it may be a better candidate to prepare a liquid retarder. Sodium pentaborate decahydrate contains 61.8 mass percent of $B_{10}O_{16}$, while sodium tetraborate decahydrate contains 40.8 mass percent of $B_4O_7$. Thus, it would be expected that the pentaborate would be the stronger retarder at an equal concentration. However, the chemical structures of the two borates being different, this may affect their performance. The performance of the two borates, in combination with a 50:50 blend of sodium lignosulfonate and sodium gluconate, was compared at 176° C. and 152 MPa. The results are presented in Table 4.

TABLE 4

Performance of sodium pentaborate decahydrate vs sodium tetraborate decahydrate.

| | | | | |
|---|---|---|---|---|
| Sodium Tetraborate (% BWOC) | 2 | — | — | — |
| Sodium Pentaborate (% BWOC) | — | 1.42 | 2 | 2 |
| Sodium Lignosulfonate (% BWOC) | 0.5 | 0.5 | 0.5 | 0.75 |
| Sodium Gluconate (% BWOC) | 0.5 | 0.5 | 0.5 | 0.75 |
| Mixing Rheology | | | | |
| Plastic Viscosity (mPa · s) | 129 | 150 | 160 | 162 |
| Yield Stress (Pa) | 6.7 | 6.2 | 9.1 | 7.2 |
| ISO/API Rheology at 85° C. | | | | |
| Plastic Viscosity (mPa · s) | 58 | 61 | 62 | 63 |
| Yield Stress (Pa) | 4.1 | 4.1 | 3.6 | 3.4 |
| Free Fluid at 85° C. (%) | 1.2 | 0.8 | 0.8 | 1.2 |
| Thickening Time at 176° C. and 152 MPa (hr:min) | 7:43 | 8:34 | 9:02 | 15:16 |

Keeping the sodium-lignosulfonate and sodium-gluconate concentrations at 0.5% BWOC each, the sodium pentaborate retarder is slightly stronger than the sodium tetraborate. A very long thickening time was obtained when the sodium-lignosulfonate and sodium-gluconate concentrations were raised to 0.75% BWOC, respectively. In the presence of sodium pentaborate decahydrate, the plastic viscosity of the cement slurries was slightly higher than that of the slurry containing sodium tetraborate decahydrate. All cement slurries were well dispersed, and the free-fluid volumes were similar.

Example 4

A liquid retarder was prepared by dissolving 140 g of sodium pentaborate decahydrate, 35 g of sodium lignosulfonate and 35 g of sodium gluconate in deionized water. Thus, the sodium pentaborate decahydrate-to-sodium lignosulfonate+sodium gluconate ratio was 2 by weight.

The effect of the liquid retarder on the thickening time of cement slurries was tested at 176° C. and 152 MPa. Tests were performed with the retarder alone, and in concert with either the AMPS-acrylamide fluid-loss additive or the styrene-butadiene latex. The liquid-retarder concentration was 133 L/tonne of cement, corresponding to 1.67% BWOC sodium pentaborate decahydrate, 0.42% BWOC sodium lignosulfonate and 0.42% BWOC sodium gluconate. Fluid-loss was also measured at 176° C. The results are presented in Table 5.

TABLE 5

Performance of a liquid retarder formulated with sodium pentaborate, sodium lignosulfonate and sodium gluconate.

| Anti-Settling Agent (% BWOC) | 0.5 | — | 0.3 |
| --- | --- | --- | --- |
| AMPS-Acrylamide Copolymer (L/tonne of cement) | — | 58 | — |
| Styrene-Butadiene Latex (L/tonne of cement) | — | — | 284 |
| Liquid Retarder (L/tonne of cement) | 133 | 133 | 133 |
| Mixing Rheology | | | |
| Plastic Viscosity (mPa · s) | 125 | 306 | 158 |
| Yield Stress (Pa) | 7.2 | 8.1 | 12.9 |
| ISO/API Rheology at 85° C. | | | |
| Plastic Viscosity (mPa · s) | 60 | 125 | 90 |
| Yield Stress (Pa) | 4.0 | 4.3 | 5.3 |
| Free Fluid at 85° C. (%) | 1.5 | 2 | 2 |
| Thickening Time at 176° C. and 152 MPa (hr:min) | 8:11 | 13:51 | 11:13 |

The sodium pentaborate decahydrate formulation was a more efficient retarder than the sodium tetraborate decahydrate formulation (2.51% BWOC vs 3% BWOC as shown in Table 4). Again, AMPS-acrylamide copolymer and styrene-butadiene latex acted as retarders. The rheological properties of the cement slurries and the free-water volumes were similar. The fluid-loss volumes were slightly higher compared to those observed with sodium tetraborate decahydrate, but remained acceptable.

Example 5

The effect of the liquid retarder described in Example 4 was tested at 110° C. and 92 MPa, and at 150° C. and 111 MPa. The liquid-retarder concentration was 53 L/tonne of cement at 110° C. and 111 L/tonne of cement at 150° C. The results are presented in Table 6.

TABLE 6

Performance of the inventive liquid retarder at 110° C. and 150° C.

| Anti-Settling Agent (% BWOC) | 0.1 | 0.4 |
| --- | --- | --- |
| Liquid Retarder (L/tonne of cement) | 53 | 89 |
| Bottom Hole Circulating Temperature (° C.) | 110 | 150 |
| Bottom Hole Pressure | 92 | 111 |
| Thickening Time at BHCT and BHP (hr:min) | 10:50 | 6:00 |

The results show that the retarder may be employed within a wide temperature range.

The invention claimed is:

1. A method for cementing a subterranean well, comprising:
   (i) providing a well-cementing composition comprising Portland cement, water and a retarder comprising a lignosulfonate compound, a borate compound and a gluconate compound, wherein the lignosulfonate compound and the borate compound are present in the composition at a lignosulfonate compound:borate-compound concentration ratio that is lower than 0.75:1, and the lignosulfonate compound, the borate compound and the gluconate compound are present in the composition at a lignosulfonate compound:borate compound:gluconate compound concentration ratio that is between 0.1:1.0:0.1 and 0.5:1.0:0.5 by weight; and
   (ii) placing the composition in the well,
   wherein the lignosulfonate compound is an oxylignin and the borate compound is sodium tetraborate decahydrate, sodium pentaborate decahydrate or both;
   wherein the composition further comprises AMPS-acrylamide copolymer or styrene butadiene latex.

2. The method of claim 1, wherein the lignosulfonate compound comprises sodium lignosulfonate, and the gluconate compound comprises sodium gluconate.

3. The method of claim 2, wherein the sodium lignosulfonate and sodium gluconate are present at a sodium lignosulfonate:sodium gluconate concentration ratio between 70:30 and 30:70 by weight.

4. The method of claim 1, wherein the retarder is provided in liquid form.

5. A method of retarding a Portland cement slurry, comprising:
   mixing a blend comprising a lignosulfonate compound, a borate compound and a gluconate compound with a Portland cement slurry, wherein the lignosulfonate compound and the borate compound are present in the blend at a lignosulfonate compound:borate-compound concentration ratio that is lower than 0.75:1, and the lignosulfonate compound, the borate compound and the gluconate compound are present in the blend at a lignosulfonate compound:borate compound:gluconate compound concentration ratio between 0.1:1.0:0.1 and 0.5:1.0:0.5 by weight,
   wherein the lignosulfonate compound is an oxylignin and the borate compound is sodium pentaborate decahydrate, sodium tetraborate decahydrate or both;
   wherein the composition further comprises AMPS-acrylamide copolymer or styrene butadiene latex.

6. The method of claim 5, wherein the lignosulfonate compound comprises sodium lignosulfonate, and the gluconate compound comprises sodium gluconate.

7. The method of claim 6, wherein the sodium lignosulfonate and sodium gluconate are present at a sodium lignosulfonate:sodium gluconate concentration ratio between 70:30 and 30:70 by weight.

8. The method of claim 5, wherein the blend is provided in liquid form.

* * * * *